(12) United States Patent
Suh et al.

(10) Patent No.: US 8,457,220 B2
(45) Date of Patent: Jun. 4, 2013

(54) MULTI-INPUT MULTI-OUTPUT-ORTHOGONAL FREQUENCY DIVISION MULTIPLEXING TRANSCEIVING METHOD AND APPARATUS

(75) Inventors: Jung-hoon Suh, Yongin-si (KR); Masaaki Fujii, Yokohama-si (JP); Sung-jin Kim, Suwon-si (KR); Ho-jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 822 days.

(21) Appl. No.: 11/830,991

(22) Filed: Jul. 31, 2007

(65) Prior Publication Data
US 2010/0027688 A1    Feb. 4, 2010

(30) Foreign Application Priority Data

Sep. 15, 2006    (KR) .................. 10-2006-0089657

(51) Int. Cl.
*H04L 27/28* (2006.01)
(52) U.S. Cl.
USPC ........................................................ 375/260
(58) Field of Classification Search
USPC ............... 375/259, 260, 295, 296, 316, 346, 375/267
See application file for complete search history.

(56) References Cited

U.S. PATENT DOCUMENTS

| | | | |
|---|---|---|---|
| 6,785,341 B2 | 8/2004 | Walton et al. | |
| 2005/0099937 A1* | 5/2005 | Oh et al. | 370/207 |
| 2005/0128993 A1* | 6/2005 | Yu et al. | 370/342 |
| 2005/0237989 A1* | 10/2005 | Ahn et al. | 370/343 |
| 2006/0067417 A1* | 3/2006 | Park et al. | 375/260 |

FOREIGN PATENT DOCUMENTS

| | | |
|---|---|---|
| EP | 1598975 A2 | 11/2005 |
| JP | 2006520109 A | 8/2006 |
| KR | 1020060034542 A | 4/2006 |
| KR | 10-2006-0039452 A | 5/2006 |
| KR | 10-2006-0064501 A | 6/2006 |
| WO | 2005006622 A1 | 1/2005 |
| WO | WO 2005-029759 A3 | 3/2005 |
| WO | 2006030479 A1 | 3/2006 |
| WO | WO 2006062356 A1 * | 6/2006 |

OTHER PUBLICATIONS

Communication dated Sep. 25, 2012 issued by the Japanese Patent Office in counterpart Japanese Application No. 2007-239461.

* cited by examiner

*Primary Examiner* — Kevin M Burd
(74) *Attorney, Agent, or Firm* — Sughrue Mion, PLLC

(57) ABSTRACT

A multi-input multi-output orthogonal frequency division multiplexing (MIMO-OFDM) transceiving system is provided, in which an MIMO-OFDM receiver feeds back ordering information, such as the order of power intensities of reception signals of a plurality of reception antennas, to an MIMO-OFDM transmitter. The MIMO-OFDM transmitter arranges subcarriers, to which data symbols have been allocated, so that the subcarriers respectively correspond to a plurality of transmission antennas, according to the fed-back information. Thus, a specific substream can be transmitted via a transmission antenna having the greatest channel gain. Consequently, the probability of properly recovering the specific substream is greatly increased.

20 Claims, 16 Drawing Sheets

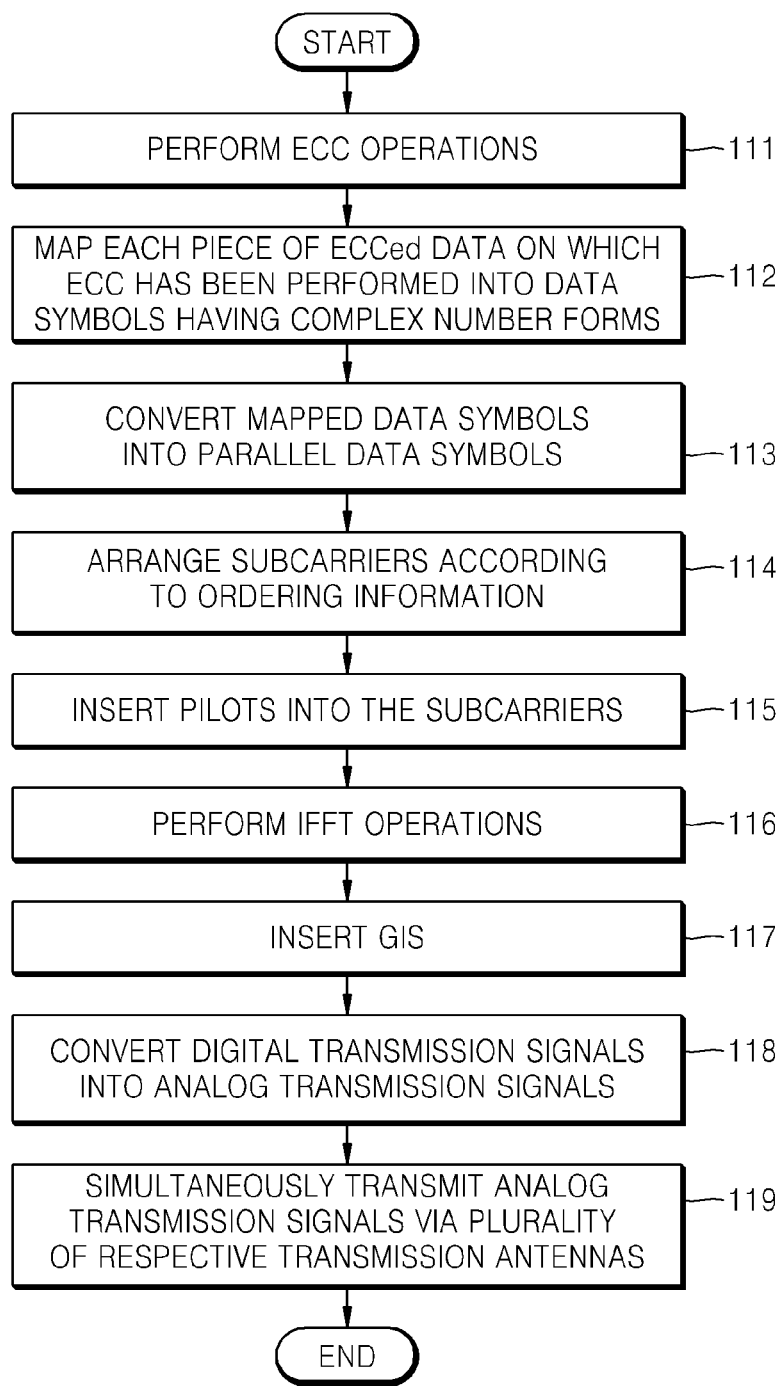

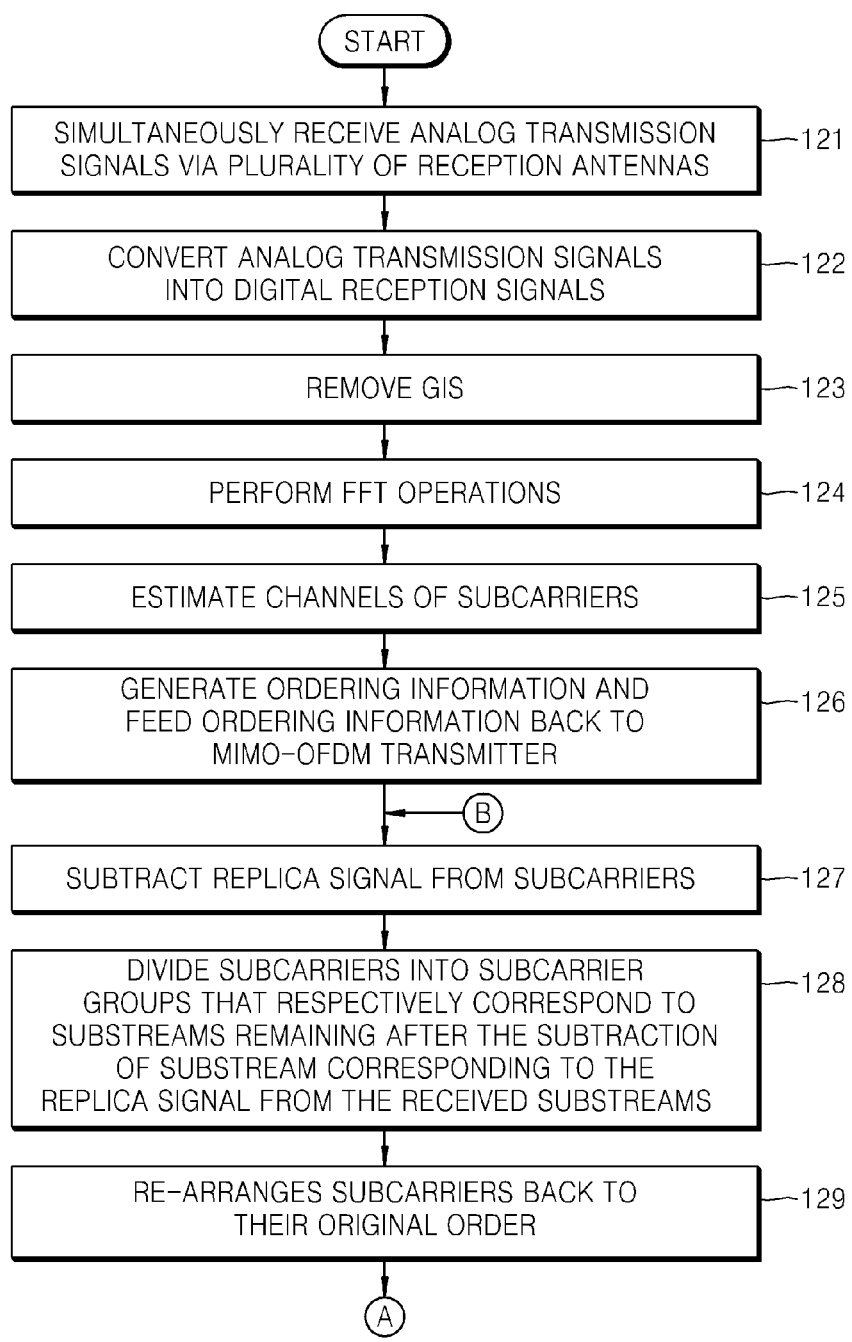

MULTI-INPUT MULTI-OUTPUT-ORTHOGONAL FREQUENCY DIVISION MULTIPLEXING TRANSCEIVING METHOD AND APPARATUS

CROSS-REFERENCE TO RELATED PATENT APPLICATION

This application claims the benefit of Korean Patent Application No. 10-2006-0089657, filed on Sep. 15, 2006, in the Korean Intellectual Property Office, the disclosure of which is incorporated herein in its entirety by reference.

BACKGROUND OF THE INVENTION

1. Field of the Invention

Methods and apparatuses consistent with the present invention relate to an orthogonal frequency division multiplexing (OFDM) transceiving system, and more particularly, to a multi-input multi-output (MIMO)-OFDM transceiving system that uses a plurality of transmission antennas and a plurality of reception antennas.

2. Description of the Related Art

FIG. 1 is a block diagram of a conventional MIMO-OFDM transmitter. Referring to FIG. 1, the conventional MIMO-OFDM transmitter includes error correction coding (ECC) units 11, symbol mappers 12, serial-parallel conversion units 13, pilot insertion units 14, inverse fast Fourier transformation (IFFT)/guard interval (GI) insertion units 15, and DAC/transmission units 16. In particular, in FIG. 1, Nt is equal to the number of transmission antennas (reception antennas), and Nc is equal to the number of subcarriers generated by each of the serial-parallel conversion units 13. A substream mentioned hereinafter denotes a data stream for each of the transmission (reception) antennas.

Each ECC unit 11 performs ECC on data corresponding to a corresponding substream in order to correct an error that may be generated in the data during data transmission. Each symbol mapper 12 maps corresponding data on which ECC has been performed by each ECC unit 11 to data symbols having complex number forms that correspond to modulation signal points.

Each serial-parallel conversion unit 13 allocates the parallel data symbols to Nc subcarriers by converting corresponding data symbols corresponding to the result of the mapping performed by each symbol mapper 12 into parallel data symbols. Each pilot insertion unit 14 receives corresponding subcarriers from the serial-parallel conversion units 13 and inserts pilots for estimating subcarriers' channels into the received subcarriers.

Each IFFT/GI insertion unit 15 generates time-domain transmission signals by performing IFFT on the subcarriers corresponding to the results of the pilot insertions made by each corresponding pilot insertion unit 14, and inserts guard intervals (GIs) for preventing interferences between the data symbols included in the transmission signals into the respective time-domain transmission signals. Each DAC/transmission unit 16 converts the digital transmission signals corresponding to the results of the GI insertions made by each corresponding IFFT/GI insertion unit 15 into analog transmission signals, and simultaneously transmits the analog transmission signals via Nt transmission antennas.

FIG. 2 is a block diagram of a conventional MIMO-OFDM receiver. Referring to FIG. 2, the conventional MIMO-OFDM receiver includes reception/ADC units 21, GI removal/FFT units 22, a channel estimation unit 23, parallel interference cancellers (PICs) 24, MIMO signal detection units 25, symbol demappers 26, error correction decoding units 27, a sub-stream selection unit 28, an ECC unit 29, a symbol mapper 210, and a replication unit 211.

Each reception/ADC unit 21 simultaneously receives corresponding analog transmission signals from the MIMO-OFDM transmitter of FIG. 1 via a plurality of reception antennas, and converts the analog transmission signals into digital reception signals. Each GI removal/FFT unit 22 removes the GIs from the digital reception signals corresponding to the results of the conversions performed by each reception/ADC unit 21. Each GI removal/FFT unit 22 also performs FFT on the GI-free reception signals in order to recover the subcarriers to which the data symbols have been allocated.

The channel estimation unit 23 estimates the channels of subcarriers recovered by all of the GI removal/FFT units 22, using the pilots included in the subcarriers. Each PIC 24 subtracts a replica signal produced by the replication unit 211 from the corresponding subcarriers recovered by each GI removal/FFT unit 22. Such a replica signal is used when substreams having errors exist, and corresponds to subcarriers corresponding to a substream properly recovered by the MIMO-OFDM receiver, the subcarriers having data symbols allocated thereto.

The MIMO signal detection units 25 receive the recovered subcarriers from the GI removal/FFT units 22 and divide the received subcarriers into subcarriers that correspond to each of the substreams, based on information about the channels estimated by the channel estimation unit 23. Each symbol demapper 26 receives a corresponding group of subcarriers from the MIMO signal detection units 25 and maps the data symbols allocated to the received subcarriers into binary data corresponding to each corresponding substream. Each error correction decoding unit 27 receives corresponding binary data from each corresponding symbol demapper 26 and corrects an error of the received binary data by using an error correction code included in the binary data.

The substream selection unit 28 selects a properly recovered substream from among the substreams recovered by the error correction decoding units 27. The ECC unit 29 performs ECC on the substream selected by the substream selection unit 28. The symbol mapper 210 maps the substream on which ECC has been performed by the ECC unit 29 to data symbols having complex number forms. The replication unit 211 produces the replica signal, which corresponds to the subcarriers to which the data symbols output from the symbol mapper 210 have been allocated.

As described above, when substreams having errors exist, the conventional MIMO-OFDM receiver re-performs ECC with respect to the properly recovered substream and performs symbol mapping, thereby producing a replica of a transmission signal corresponding to the properly recovered substream. The conventional MIMO-OFDM receiver also subtracts the replica signal from the reception signals and re-performs a signal division operation with respect to the residual signals. Accordingly, the number of substreams to be equivalently error-correction-decoded is reduced, and the degree of signal division is improved. This transceiving process repeats until all of the substreams are properly recovered.

However, in such a conventional MIMO-OFDM transceiving method, when all the substreams have errors, producing a replica signal for a properly recovered substream is impossible. Thus, in such a conventional MIMO-OFDM transceiving method, parallel interferences between substreams cannot be cancelled. In other words, if a replica signal for a substream having an error is used to cancel the parallel interferences between substreams, the error included in the substream spreads to the other substreams, and thus the other substreams are mapped into wrong data symbols. This hinders generation of a proper replica signal. Therefore, the degree of signal division is greatly degraded.

SUMMARY OF THE INVENTION

The present invention provides an apparatus and method capable of effectively canceling parallel interferences between substreams by using a properly recovered substream by preventing the generation of errors in all the substreams.

The present invention also provides a computer readable recording medium having recorded thereon a computer program for executing the method.

According to an aspect of the present invention, there is provided a transmitting method comprising the operations of: arranging subcarriers to which data symbols have been allocated, so as to respectively correspond to a plurality of transmission antennas, according to information fed back from a receiver; generating transmission signals by modulating the arranged subcarriers; and transmitting the transmission signals to the receiver via the respective transmission antennas.

According to another aspect of the present invention, there is provided a computer readable recording medium that records a computer program for executing the above-described transmitting method.

According to another aspect of the present invention, there is provided a transmitting apparatus comprising: precoders which arrange subcarriers to which data symbols have been allocated, so as to respectively correspond to a plurality of transmission antennas, according to information fed back from a receiver; IFFT units which generate transmission signals by performing IFFT operations on the arranged subcarriers; and transmission units which transmit the transmission signals to the receiver via the respective transmission antennas.

According to another aspect of the present invention, there is provided a receiving method comprising the operations of: receiving a plurality of signals from a transmitter via a plurality of reception antennas; measuring predetermined characteristics of the received signals and feeding information about the order of the measured characteristics back to the transmitter; and recovering data from the reception signals using information previously provided to the transmitter.

According to another aspect of the present invention, there is provided a computer readable recording medium that records a computer program for executing the above-described receiving method.

According to another aspect of the present invention, there is provided a receiving apparatus comprising: reception units which receive a plurality of signals from a transmitter via a plurality of reception antennas; feedback units which measure predetermined characteristics of the received signals and feed back information about the order of the measured characteristics to the transmitter; precoders which rearrange the subcarriers recovered from the reception signals back to their original order according to the information previously provided to the transmitter; and symbol demappers which map data symbols allocated to the rearranged subcarriers into data corresponding to the substreams.

BRIEF DESCRIPTION OF THE DRAWINGS

The above and other features and advantages of the present invention will become more apparent by describing in detail exemplary embodiments thereof with reference to the attached drawings in which:

FIG. 11 is a flowchart of a MIMO-OFDM transmitting method according to an exemplary embodiment of the present invention;

FIGS. 12A and 12B are a flowchart of a MIMO-OFDM receiving method according to an exemplary embodiment of the present invention;

DETAILED DESCRIPTION OF THE INVENTION

The present invention will now be described more fully with reference to the accompanying drawings, in which exemplary embodiments of the invention are shown.

Figure 1:
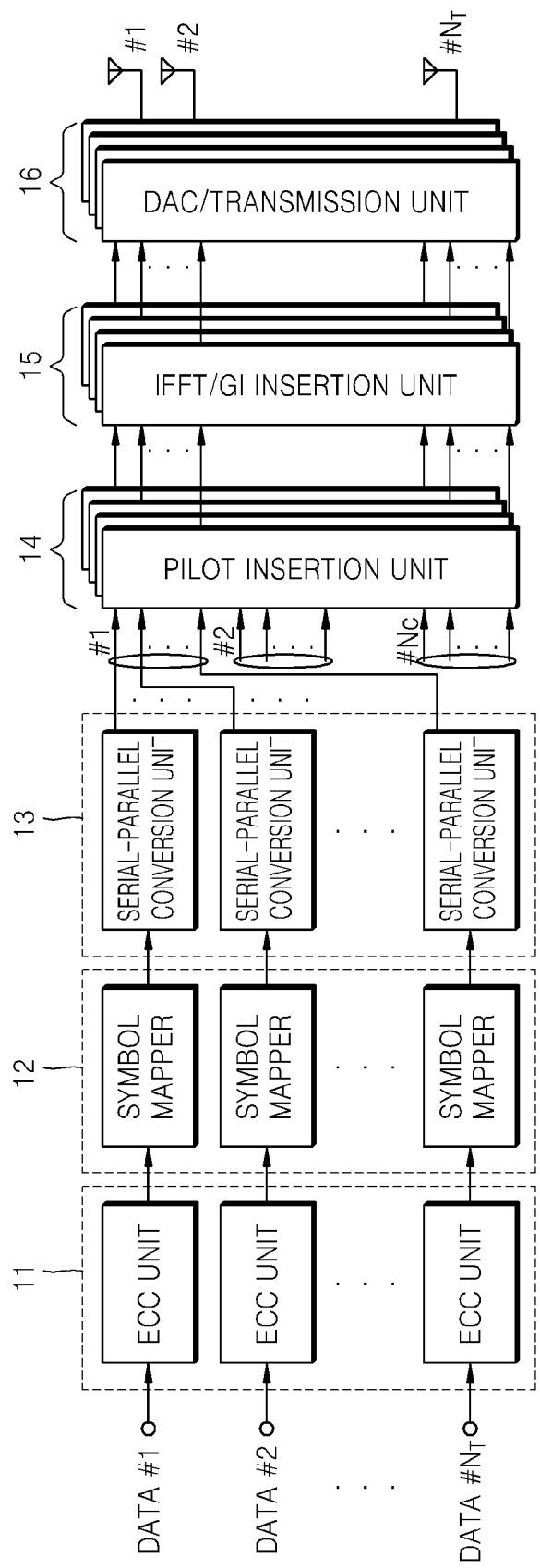
FIG. 1 is a block diagram of a conventional multi-input multi-output orthogonal frequency division multiplexing (MIMO-OFDM) transmitter.
Figure 2:
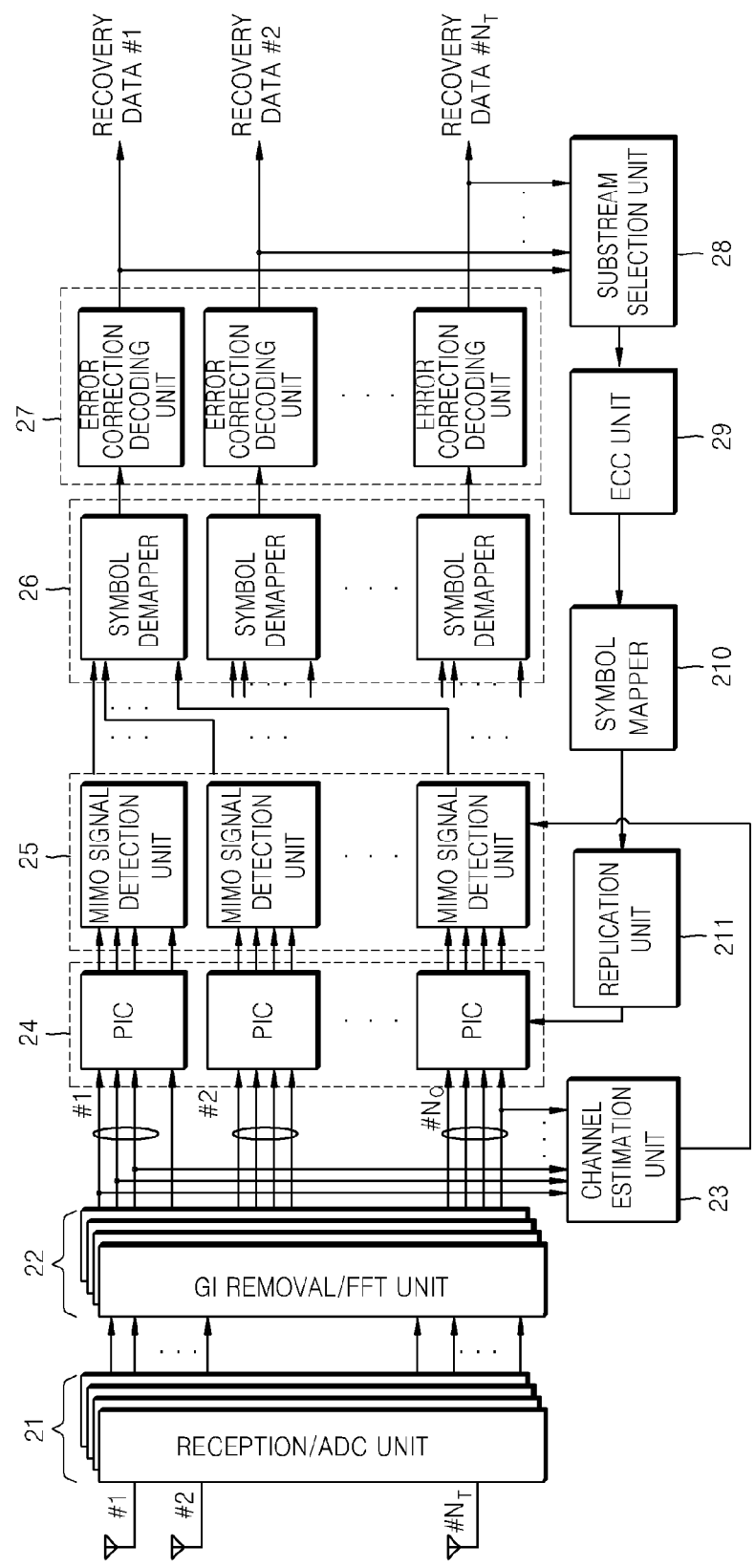
FIG. 2 is a block diagram of a conventional MIMO-OFDM receiver.
Figure 3:
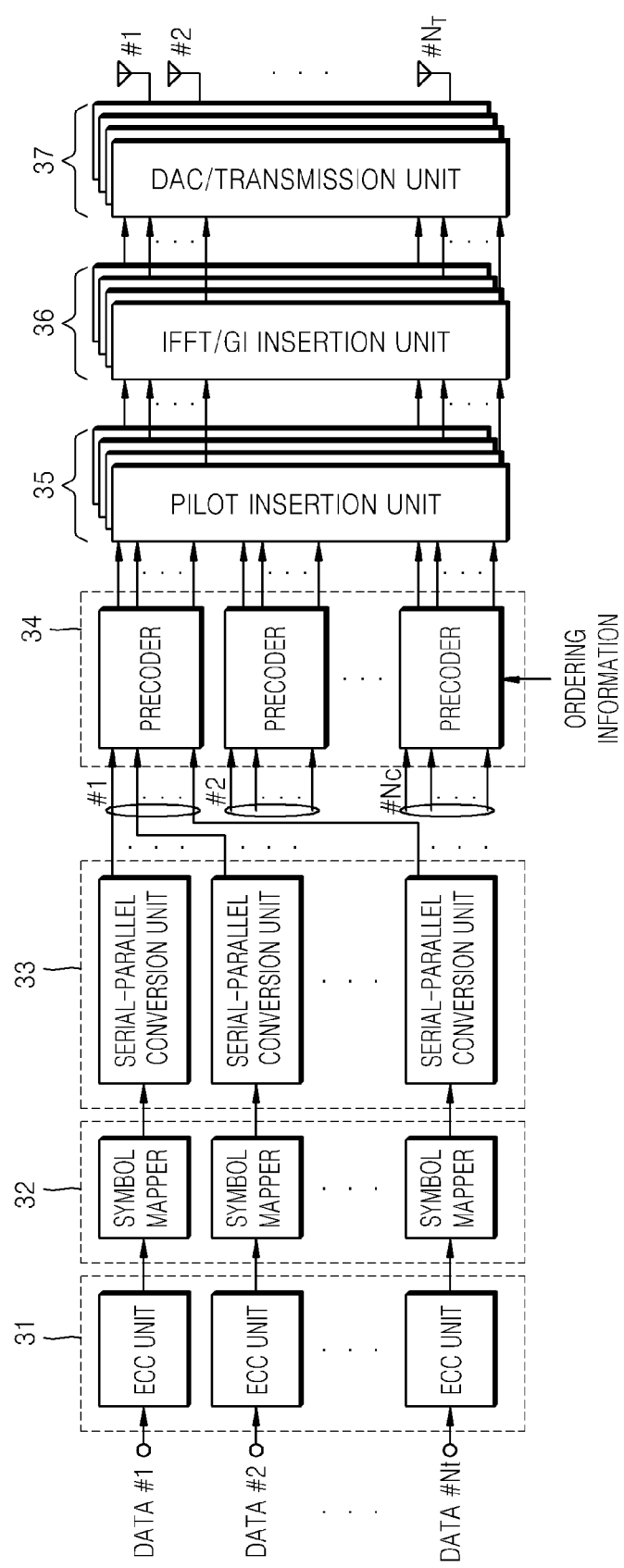
FIG. 3 is a block diagram of a MIMO-OFDM transmitter according to an exemplary embodiment of the present invention.

FIG. 3 is a block diagram of a multi-input multi-output orthogonal frequency division multiplexing (MIMO-OFDM) transmitter according to an exemplary embodiment of the present invention. Referring to FIG. 3, the MIMO-OFDM transmitter includes error correction coding (ECC) units 31, symbol mappers 32, serial-parallel conversion units 33, precoders 34, pilot insertion units 35, inverse fast Fourier transformation (IFFT)/guard interval (GI) insertion units 36, and DAC/transmission units 37. In particular, in FIG. 3, Nt is equal to the number of transmission antennas and the number of reception antennas, and Nc is equal to the number of subcarriers output by each serial-parallel conversion unit 33. In an MIMO environment, each substream denotes a data stream for each of the transmission and reception antennas. In an OFDM environment, the subcarriers have orthogonal frequencies.

Each ECC unit 31 performs ECC to correct an error that may be generated in data corresponding to a substream corresponding to the ECC unit 31 during data transmission. For example, the ECC units 31 may perform ECC operations using a Reed-Solomon code, a convolution code, a low density parity check (LDPC) code, or the like.

Each symbol mapper 32 maps data on which ECC has been performed by each corresponding ECC unit 31 to data symbols having complex number forms that correspond to modulation signal points of a modulation method, such as binary phase shift keying (BPSK), quadrature phase shift keying (QPSK), or quadrature amplitude modulation (QAM). For example, the symbol mappers 32 may map the binary data to 16 complex symbols based on a 16-QAM method, in units of 4 bits.

Each serial-parallel conversion unit 33 allocates the parallel data symbols to Nc subcarriers by converting data symbols corresponding to the result of the mapping performed by each corresponding symbol mapper 32 into parallel data symbols.

Figure 8:
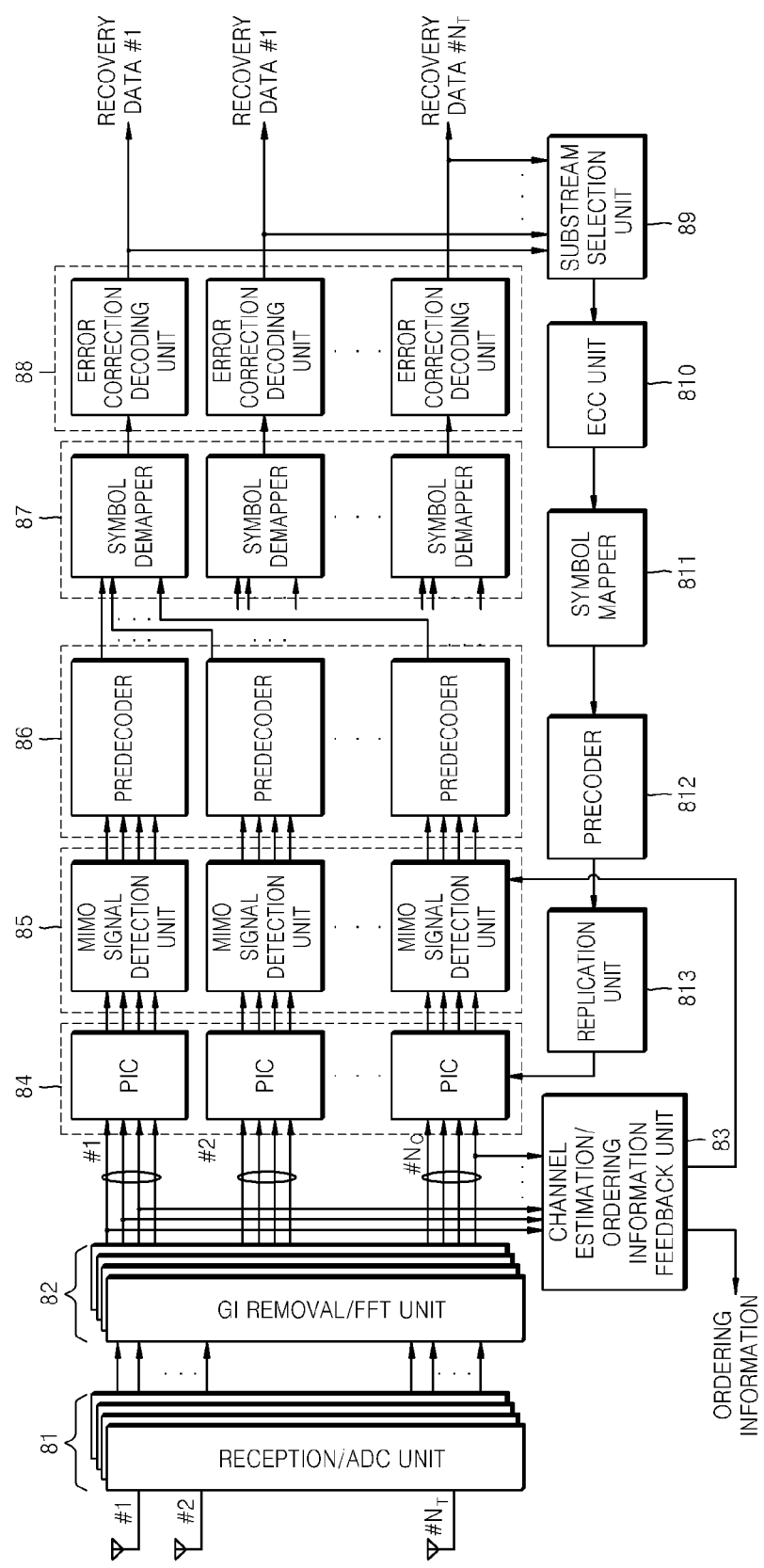
FIG. 8 is a block diagram of a MIMO-OFDM receiver according to an exemplary embodiment of the present invention.

Each precoder 34 receives corresponding subcarriers from the serial-parallel conversion units 33 and arranges the subcarriers so that the subcarriers respectively correspond to the transmission antennas, according to ordering information fed back from an MIMO-OFDM receiver shown in FIG. 8. The ordering information represents the order of power intensities of reception signals of reception antennas, which are measured by the MIMO-OFDM receiver shown in FIG. 8. In particular, in the present embodiment, each precoder 34 produces a precoding matrix that represents the order of power intensities of the reception signals of the reception antennas, based on the ordering information fed back from the MIMO-OFDM receiver shown in FIG. 8, and perform a precoding operation of multiplying the precoding matrix by m-th subcarriers $S_i(m)$ (where i=1 to Nt) from among the subcarriers output from the serial-parallel conversion units 33. Therefore, the m-th subcarriers $S_i(m)$ are arranged to correspond to the respective transmission antennas.

Figure 4:
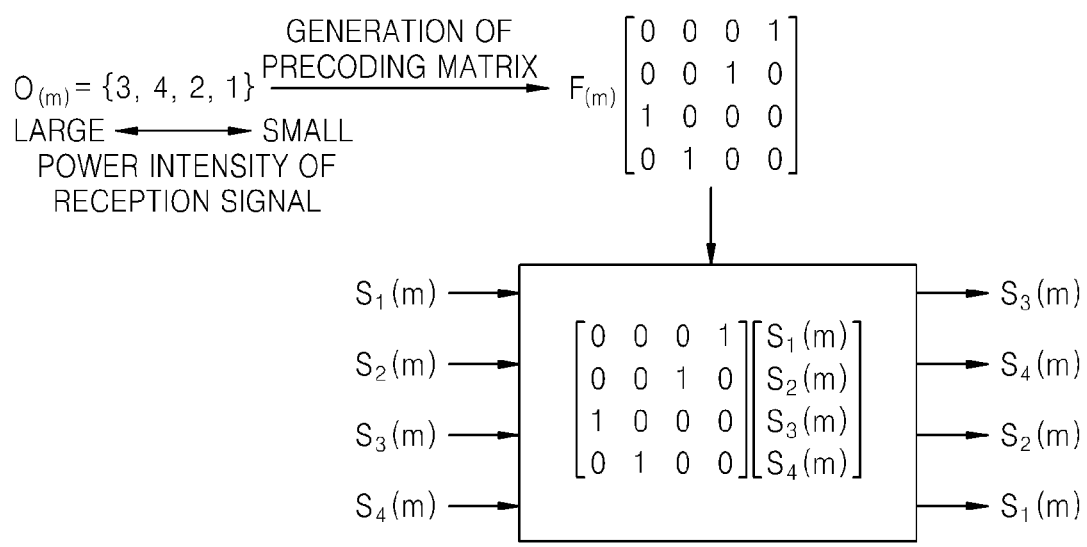
FIG. 4 illustrates a way of producing a 4×4 precoding matrix according to an exemplary embodiment of the present invention.

FIG. 4 illustrates a way of producing a 4×4 precoding matrix according to an exemplary embodiment of the present invention. The 4×4 precoding matrix of FIG. 4 is obtained under the assumption that the MIMO-OFDM transmitter of FIG. 3 includes 4 reception antennas and 4 transmission antennas.

Referring to FIG. 4, ordering information O(m) with respect to m-th subcarriers is {3, 4, 2, 1}, which means that the power intensities of reception signals are decreasing in the order of a third reception antenna, a fourth reception antenna, a second reception antenna, and a first reception antenna. In this case, in order to form a first column of the precoding matrix, each precoder 34 sets 1 on a row represented by the first antenna index, 3, of the ordering information, that is, on a third row, and 0 on the remaining rows. In order to form a second column of the precoding matrix, each precoder 34 sets 1 on a row represented by the second antenna index, 4, of the ordering information, that is, on a fourth row, and 0 on the remaining rows. In order to form a third column of the precoding matrix, each precoder 34 sets 1 on a row represented by the third antenna index, 2, of the ordering information, that is, on a second row, and 0 on the remaining rows. In order to form a fourth column of the precoding matrix, each precoder 34 sets 1 on a row represented by the fourth antenna index, 1, of the ordering information, that is, on a first row, and 0 on the remaining rows.

That is, each precoder 34 performs a precoding operation of multiplying the 4×4 precoding matrix by four m-th subcarriers respectively output from the four serial-parallel conversion units 33, in order to arrange the subcarriers so that the m-th subcarrier $S_i(m)$ output from a third serial-parallel conversion unit 33 is transmitted via a transmission antenna that corresponds to a reception signal having the greatest power intensity, the m-th subcarrier output from a fourth serial-parallel conversion unit 33 is transmitted via a transmission antenna that corresponds to a reception signal having the next greatest power intensity, the m-th subcarrier output from a first serial-parallel conversion unit 33 is transmitted via a transmission antenna that corresponding to a reception signal having the next greatest power intensity, and the m-th subcarrier output from a second serial-parallel conversion unit 33 is transmitted via a transmission antenna that corresponds to a reception signal having the lowest power intensity.

Figure 5:
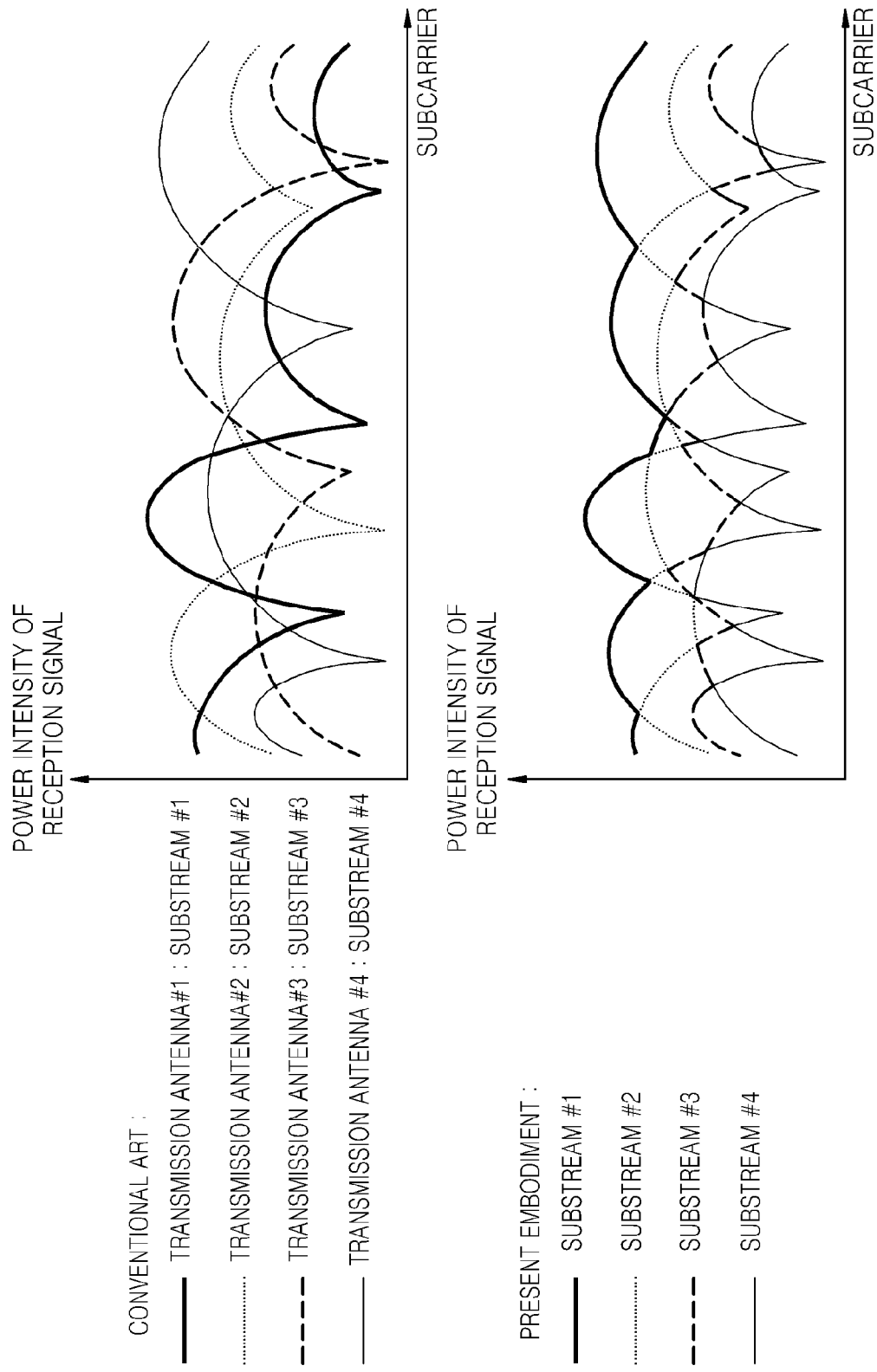
FIG. 5 illustrates power intensities of reception signals when the 4×4 precoding matrix shown in FIG. 4 is applied.

FIG. 5 illustrates power intensities of reception signals when the 4×4 precoding matrix shown in FIG. 4 is applied. Referring to FIG. 5, in the conventional art, a specific substream is transmitted via a specific transmission antenna all the time. For example, a first substream is always transmitted via a first transmission antenna and received via a first reception antenna. Accordingly, the power intensity of the first substream when being received varies according to changes in the communications environment between the first transmission antenna and the first reception antenna. However, in the present embodiment, based on ordering information obtained dynamically with changes in the communications environment between the transmission antennas and the reception antennas, a first substream is transmitted via a transmission antenna that corresponds to a reception signal having the greatest power intensity, that is, via a transmission antenna having the greatest channel gain. Hence, in the present embodiment, the probability that the first substream is properly recovered is increased.

The ordering information may represent the order of the power intensities of reception signals received via some of the reception antennas instead of all of the reception antennas as described above. When the ordering information fed back from the MIMO-OFDM receiver of FIG. 8 represents the order of the power intensities of reception signals of some of the reception antennas attached to the MIMO-OFDM receiver, each precoder 34 arranges some of the received subcarriers according to this ordering information so as to correspond to some of the transmission antennas, and arranges the other subcarriers according to a general order used in the MIMO-OFDM transmitter of FIG. 3 so as to correspond to the other transmission antennas.

Figure 6:
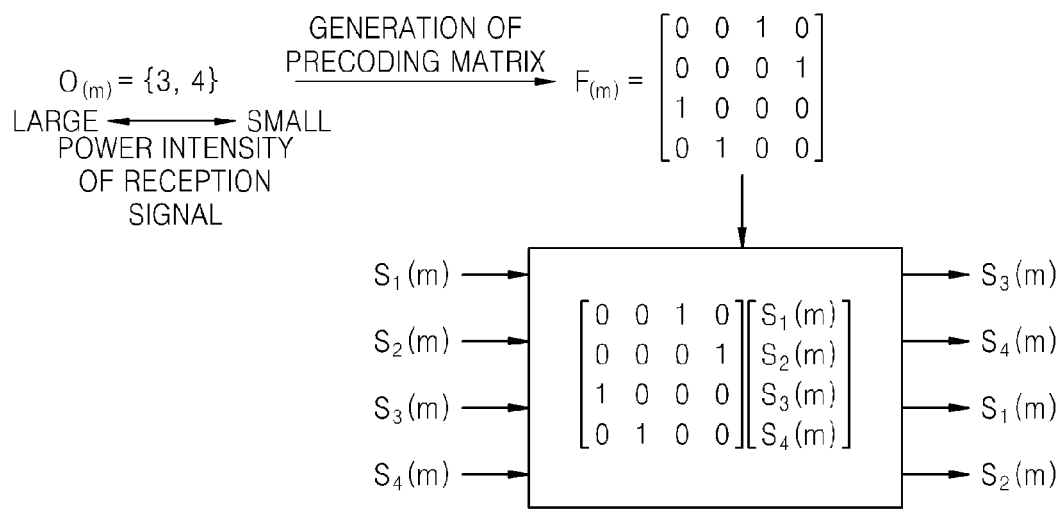
FIG. 6 illustrates production of a 4×4 precoding matrix according to a way other than that illustrated in FIG. 4.

FIG. 6 illustrates production of a 4×4 precoding matrix according to a way other than that illustrated in FIG. 4. Referring to FIG. 6, ordering information O(m) with respect to m-th subcarriers is {3, 4}, which is a part of {3, 4, 2, 1} shown in FIG. 4. In this case, in order to form a first column of the precoding matrix, each of precoders 34 sets 1 on a row represented by the first antenna index, 3, of the ordering information, that is, on a third row, and 0 on the remaining rows. In order to form a second column of the precoding matrix, each of the 4 precoders 34 sets 1 on a row represented by the second antenna index, 4, of the ordering information, that is, on a fourth row, and 0 on the remaining rows. In order to form a third column of the precoding matrix, each of the 4 precoders 34 sets 1 on one of rows other than the rows represented by the first and second antenna indices, 3 and 4, for example, on a first row, and 0 on the remaining rows. In order to form a fourth column of the precoding matrix, each of the 4 precoders 34 sets 1 on the residual row, for example, on a second row, and 0 on the remaining rows.

An aspect of the present embodiment is to properly recover at least one substream. Thus, even when an MIMO-OFDM receiver provides ordering information about some of the reception antennas attached thereto instead of ordering information about all of the reception antennas, the aspect of the present invention is attained. As such, the MIMO-OFDM receiver can reduce the amount of feedback information by feeding back only the ordering information about some of the reception antennas to a corresponding MIMO-OFDM transmitter.

Figure 7:
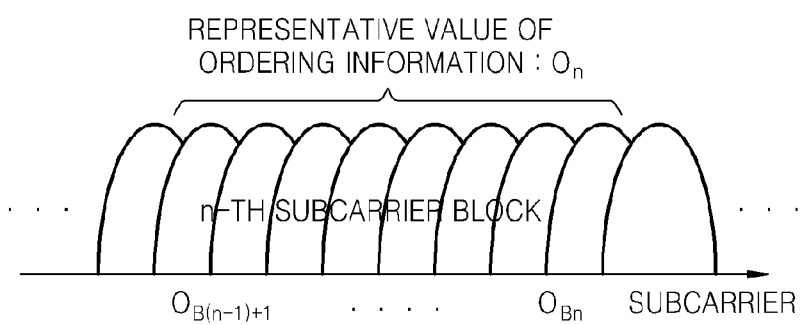
FIG. 7 illustrates a method of transmitting ordering information for every subcarrier block according to an exemplary embodiment of the present invention.

FIG. 7 illustrates a method of transmitting ordering information for every subcarrier block according to an exemplary embodiment of the present invention. Referring to FIG. 7, for example, ordering information $O_n$ fed back from the MIMO-OFDM receiver of FIG. 8 is transmitted for an n-th subcarrier block, that is, a block corresponding to a collection of B consecutive n-th subcarriers $S_i(n)$ (where i=1 to B). In other words, the n-th subcarrier block is in the range of a (B(n−1)+1)th subcarrier through to a Bn-th subcarrier. In this case, each predecoder 34 arranges all of the subcarriers constituting an n-th subcarrier block so as to correspond to one transmission antenna, according to one piece of ordering information that covers the n-th subcarrier block. This is because channel correlation between adjacent subcarriers is high. As described above, the MIMO-OFDM receiver can reduce the amount of feedback information by feeding back only one piece of ordering information for the subcarriers constituting one subcarrier block instead of feeding back respective pieces of information for subcarriers.

The ordering information may represent the order of signal interference to noise ratios (SINRs) of the reception signals of the reception antennas instead of representing the order of power intensities of the reception signals of the reception antennas measured by the MIMO-OFDM receiver of FIG. 8. The SINR denotes a ratio between a reception intensity of a desired signal and a reception intensity of an undesired signal (e.g., noise or interference). In particular, it will be understood by one of ordinary skill in the art to which the present embodiment pertains that the ordering information can be easily configured using characteristic values other than the power intensity and the SINR.

Each pilot insertion unit 35 inserts pilots for estimating subcarriers' channels into the corresponding subcarriers arranged by each precoder 34.

Each IFFT/GI insertion unit 36 generates time-domain transmission signals by modulating the subcarriers corresponding to the results of the pilot insertions made by each pilot insertion unit 35, i.e., by performing IFFT operations on the subcarriers. Each IFFT/GI insertion unit 36 also inserts GIs for preventing interferences between the data symbols included in the transmission signals into the corresponding time-domain transmission signals.

Each DAC/transmission unit 37 converts the digital transmission signals corresponding to the results of the GI insertions made by each corresponding IFFT/GI insertion unit 36 into analog transmission signals, and transmits the analog transmission signals via the respective transmission antennas.

FIG. 8 is a block diagram of a MIMO-OFDM receiver according to an exemplary embodiment of the present invention. Referring to FIG. 8, the MIMO-OFDM receiver includes reception/ADC units 81, GI removal/FFT units 82, a channel estimation/ordering information feedback unit 83, PICs 84, MIMO signal detection units 85, predecoders 86, symbol demappers 87, error correction decoding units 88, a substream selection unit 89, an ECC unit 810, a symbol mapper 811, a precoder 812, and a replication unit 813.

Each reception/ADC unit 81 simultaneously receives corresponding analog transmission signals from the MIMO-OFDM transmitter of FIG. 3 via a plurality of reception antennas, and converts the analog transmission signals into digital reception signals.

Each GI removal/FFT unit 82 removes the GIs from the digital reception signals corresponding to the results of the conversions performed by each reception/ADC unit 81. Each GI removal/FFT unit 82 also demodulates the GI-free reception signals, that is, performs FFT operations on the GI-free reception signals, in order to recover the subcarriers to which the data symbols have been allocated.

The channel estimation/ordering information feedback unit 83 estimates the channels of subcarriers recovered by all of the GI removal/FFT units 82, using the pilots included in the recovered subcarriers. The channel estimation/ordering information feedback unit 83 also measures the power intensities of the reception signals of the reception antennas, generates ordering information representing the order of the power intensities of the reception signals based on the results of the measuring, and feeds back the ordering information to the MIMO-OFDM transmitter of FIG. 3.

In particular, the channel estimation/ordering information feedback unit 83 may generate ordering information representing the order of the power intensities of reception signals received via some of the reception antennas instead of all of the reception antennas, in order to reduce the amount of information to be fed back to the MIMO-OFDM transmitter of FIG. 3. An example of such ordering information may be a table including an index of an antenna via which a reception signal having the greatest power intensity is received and an index of an antenna via which a reception signal having the next greatest power intensity is received.

The channel estimation/ordering information feedback unit 83 also may feed back only one piece of ordering information representing all of the subcarriers constituting one subcarrier block instead of feeding back respective pieces of information for the subscribers, in order to reduce the amount of information to be fed back to the MIMO-OFDM transmitter of FIG. 3.

Alternatively, the channel estimation/ordering information feedback unit 83 may measure the SINRs of the reception signals of the reception antennas, generates ordering information representing the order of the SINRs of the reception signals based on the results of the measuring, and feeds back the ordering information to the MIMO-OFDM transmitter of FIG. 3.

Each PIC 84 subtracts a replica signal produced by the replication unit 813 from the corresponding subcarriers recovered by each GI removal/FFT unit 82. Such a replica signal corresponds to a replica of subcarriers corresponding to a substream properly recovered by the MIMO-OFDM receiver when substreams have errors, the subcarriers having data symbols allocated thereto.

The MIMO signal detection units 85 receive the recovered subcarriers from the GI removal/FFT units 82 and divide the received subcarriers into subcarrier groups that respectively correspond to the substreams, based on information about the channels estimated by the channel estimation/ordering information feedback unit 83. In particular, the MIMO signal detection units 85 divide subcarriers corresponding to the result of the subtraction performed by the PICs 84 into subcarrier groups that respectively correspond to substreams remaining after the subtraction of a substream corresponding to the replica signal from the received substreams. The subtraction of the replica signal by the PICs 84 and the division of the remaining signals by the MIMO signal detection units 85 are repeated. In other words, when substreams having errors exist, generation of a replica signal from a properly recovered substream, subtraction of the replica signal, signal division, symbol demapping, and error correction decoding are repeated. Accordingly, the number of substreams to be equivalently error-correction-decoded is reduced, and the degree of signal division is improved. Furthermore, the effect of error correction is improved, and errorless substreams can be obtained.

Each predecoder 86 rearranges subcarriers output from each corresponding MIMO signal detection unit 85 back to their original order according to the ordering information previously provided to the MIMO-OFDM transmitter of FIG. 3. More specifically, each predecoder 86 produces a predecoding matrix for returning a precoded state to its original state, based on the ordering information provided to the MIMO-OFDM transmitter of FIG. 3, and performs a predecoding operation of multiplying the predecoding matrix by m-th subcarriers $S_i(m)$ (where i=1 to Nt) from among the subcarriers output from the MIMO signal detection units 85. The predecoding matrix is the same as the precoding matrix produced by the MIMO-OFDM transmitter of FIG. 3.

Each symbol demapper 87 receives corresponding subcarriers arranged by each corresponding predecoder 86 and maps the data symbols allocated to the received subcarriers into binary data corresponding to a corresponding substream. For example, each symbol demapper 87 may map each of 16 complex data symbols based on a 16-QAM method into 4 bits of binary data.

Each error correction decoding unit 88 receives corresponding binary data from each corresponding symbol demapper 87 and corrects an error of the received binary data by using an error correction code included in the binary data.

The substream selection unit 89 selects a properly recovered substream from among the substreams recovered by the error correction decoding units 88. The ECC unit 810 performs ECC on the substream selected by the substream selection unit 89. The symbol mapper 811 maps the substream on which ECC has been performed by the ECC unit 810 into data symbols having complex number forms. The precoder 812 receives the data symbols output from the symbol mapper 811 and arranges the subcarriers including the data symbols so as to respectively correspond to the transmission antennas, according to ordering information provided to the MIMO-OFDM transmitter of FIG. 3. The replication unit 813 produces the replica signal for the subcarriers arranged by the precoder 812.

Figure 9:
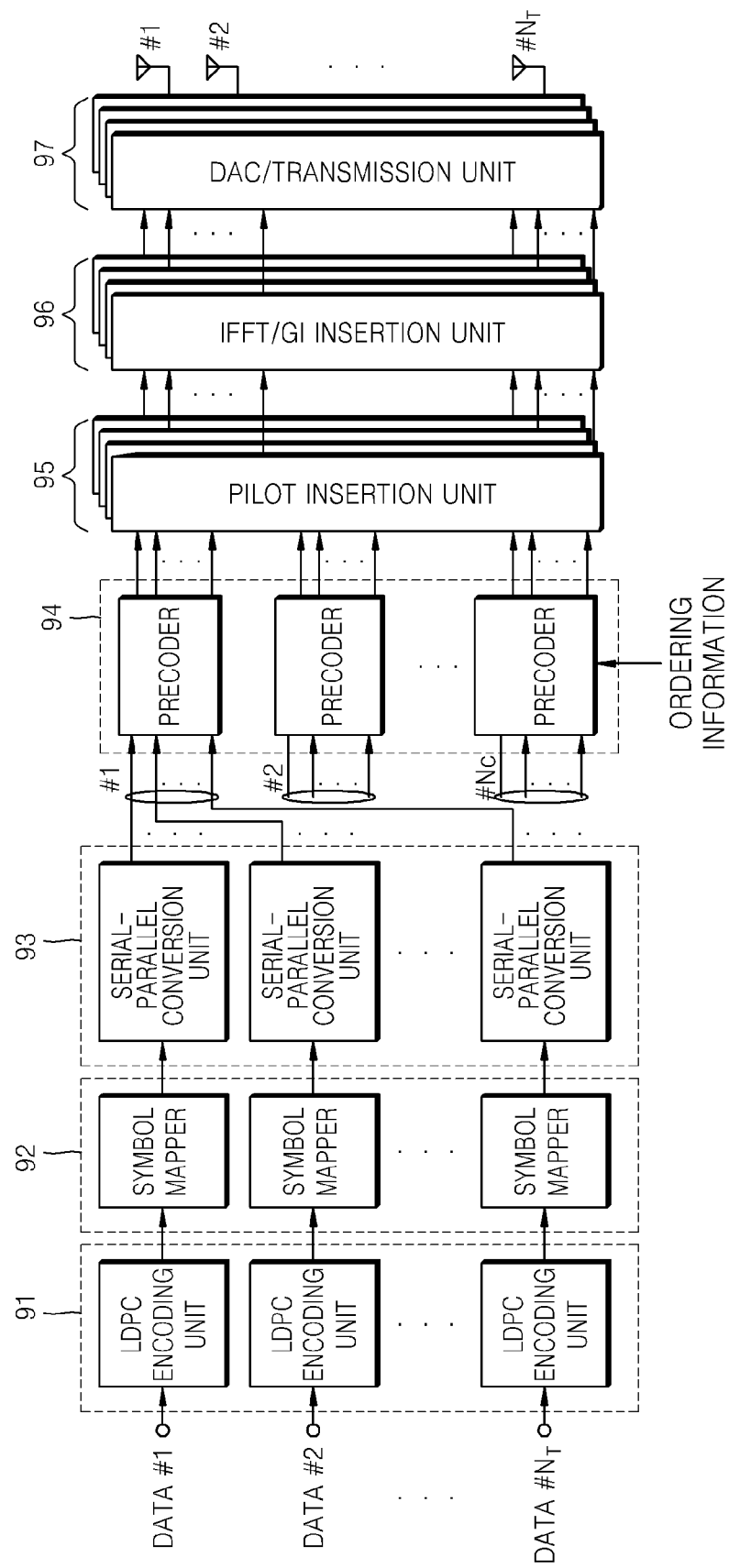
FIG. 9 is a block diagram of an embodiment of the MIMO-OFDM transmitter shown in FIG. 3.

FIG. 9 is a block diagram of an embodiment of the MIMO-OFDM transmitter shown in FIG. 3. Referring to FIG. 9, the MIMO-OFDM transmitter includes LDPC coding units 91, symbol mappers 92, serial-parallel conversion units 93, precoders 94, pilot insertion units 95, IFFT/GI insertion units 96, and DAC/transmission units 97. The MIMO-OFDM transmitter of FIG. 9 is an embodiment in which the ECC units 31 shown in FIG. 3 are implemented as the LDPC encoding units 91.

Each LDPC encoding unit 91 performs ECC to correct an error that may be generated in a corresponding substream during substream transmission, using a corresponding LDPC code. It will be understood by one of ordinary skill in the art to which the present embodiment pertains that transmitters other than the transmitter shown in FIG. 9 can be easily implemented.

Figure 10:
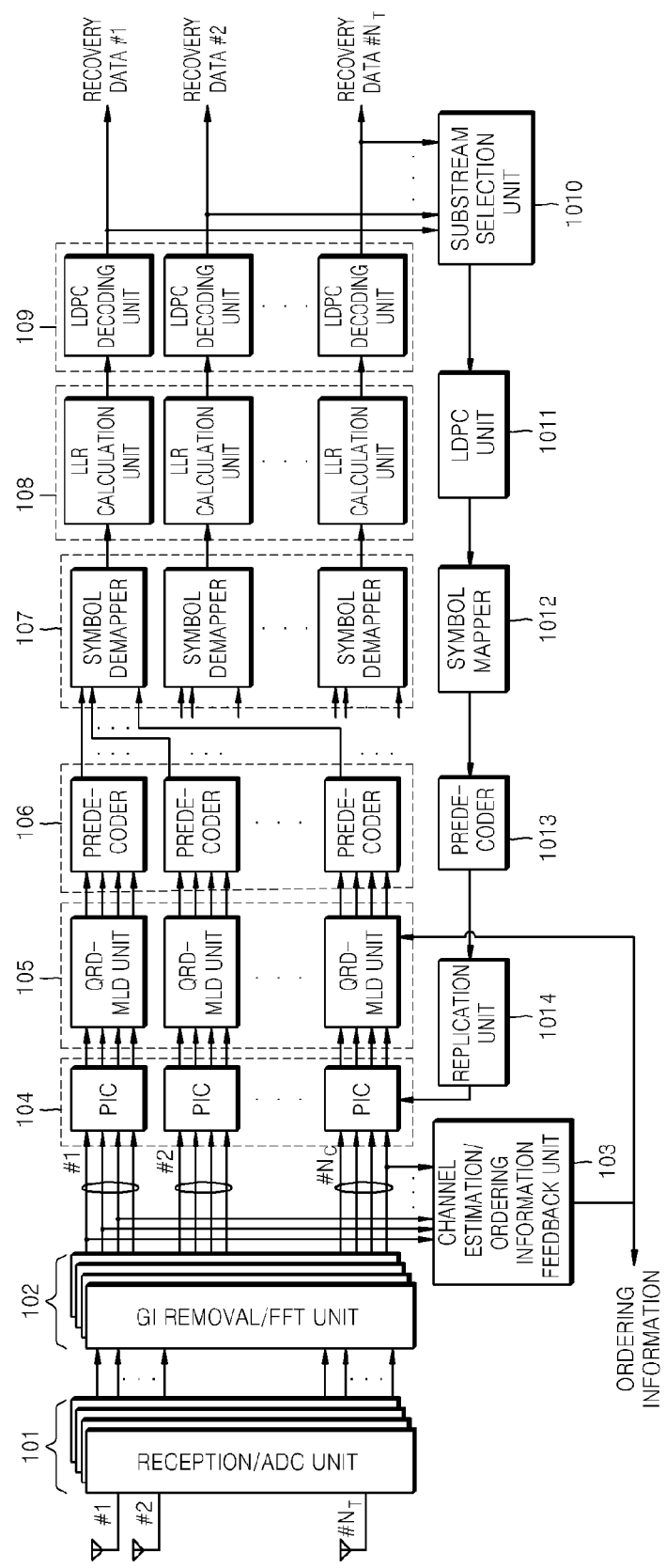
FIG. 10 is a block diagram of an embodiment of the MIMO-OFDM receiver shown in FIG. 8.

FIG. 10 is a block diagram of an embodiment of the MIMO-OFDM receiver shown in FIG. 8. Referring to FIG. 10, the MIMO-OFDM receiver includes reception/ADC units 101, GI removal/FFT units 102, a channel estimation/ordering information feedback unit 103, PICs 104, QR decomposition-maximum likelihood detection (QRD-MLD) units 105, predecoders 106, symbol demappers 107, log-likelihood ratio (LLR) calculation units 108, LDPC decoding units 109, a substream selection unit 1010, an LDPC encoding unit 1011, a symbol mapper 1012, a precoder 1013, and a replication unit 1014. The MIMO-OFDM receiver of FIG. 10 is an embodiment in which the MIMO signal detection units 85 of FIG. 3 are implemented as the QRD-MLD units 105, the error correction decoding units 88 of FIG. 3 are implemented as the LLR calculation units 108 and the LDPC decoding units 109, and the ECC unit 810 of FIG. 3 is implemented as the LDPC encoding unit 1011.

The QRD-MLD units 105 receive the recovered subcarriers from the GI removal/FFT units 102 and divide the received subcarriers into subcarrier groups that respectively correspond to the substreams, by using a QRD-based MLD method as a signal division algorithm. In other words, each QRD-MLD unit 105 generates a complex conjugate transposed matrix of a matrix Q by QR-decomposing a channel matrix corresponding to the information about channels estimated by the channel estimation/ordering information feedback unit 103, and generates an upper triangular matrix with respect to a channel response of vectors of received subcarriers by multiplying the complex conjugate transposed matrix by the vectors of the received subcarriers. In this way, the vectors of the subcarriers can be effectively searched for.

Each LLR calculation unit 108 calculates an LLR value for binary data corresponding to the result of demapping performed by each corresponding symbol demapper 107. Each LDPC decoding unit 109 performs error correction decoding to correct an error that may be generated in a corresponding substream during substream transmission, using a corresponding LLR value calculated by each LLR calculation unit 108. It will be understood by one of ordinary skill in the art to which the present embodiment pertains that receivers other than the receiver shown in FIG. 10 can be easily implemented.

FIG. 11 is a flowchart of a MIMO-OFDM transmitting method according to an exemplary embodiment of the present invention. Referring to FIG. 11, the MIMO-OFDM transmitting method includes operations time-serially performed in the MIMO-OFDM transmitter of FIG. 3. Hence, although not described hereinafter, the above-description of the MIMO-OFDM transmitter of FIG. 3 can be entirely applied to the MIMO-OFDM transmitting method.

In operation 111, the MIMO-OFDM transmitter performs ECC to correct errors that may be generated in data corresponding to substreams during data transmission.

In operation 112, the MIMO-OFDM transmitter maps each piece of data on which ECC has been performed in operation 111 into data symbols having complex number forms that correspond to modulation signal points of a modulation method.

In operation 113, the MIMO-OFDM transmitter converts data symbols corresponding to the results of the mapping performed in operation 112 into parallel data symbols and allocates the parallel data symbols to sub carriers.

In operation 114, the MIMO-OFDM transmitter arranges the subcarriers to which the data symbols have been allocated in operation 113 so that the subcarriers respectively correspond to the transmission antennas, according to ordering information fed back from a MIMO-OFDM receiver shown in FIG. 8.

In operation 115, the MIMO-OFDM transmitter inserts pilots for estimating subcarriers' channels into the subcarriers arranged in operation 114.

In operation 116, the MIMO-OFDM transmitter generates time-domain transmission signals by performing IFFT on the subcarriers corresponding to the results of the pilot insertions made in operation 115.

In operation 117, the MIMO-OFDM transmitter inserts GIs into the time-domain transmission signals generated in operation 116, in order to prevent interferences between the data symbols included in the transmission signals.

In operation 118, the MIMO-OFDM transmitter converts the digital transmission signals corresponding to the results of the GI insertions made in operation 117 into analog transmission signals In operation 119, the MIMO-OFDM transmitter simultaneously transmits the analog transmission signals via the respective transmission antennas.

Figure 12B:
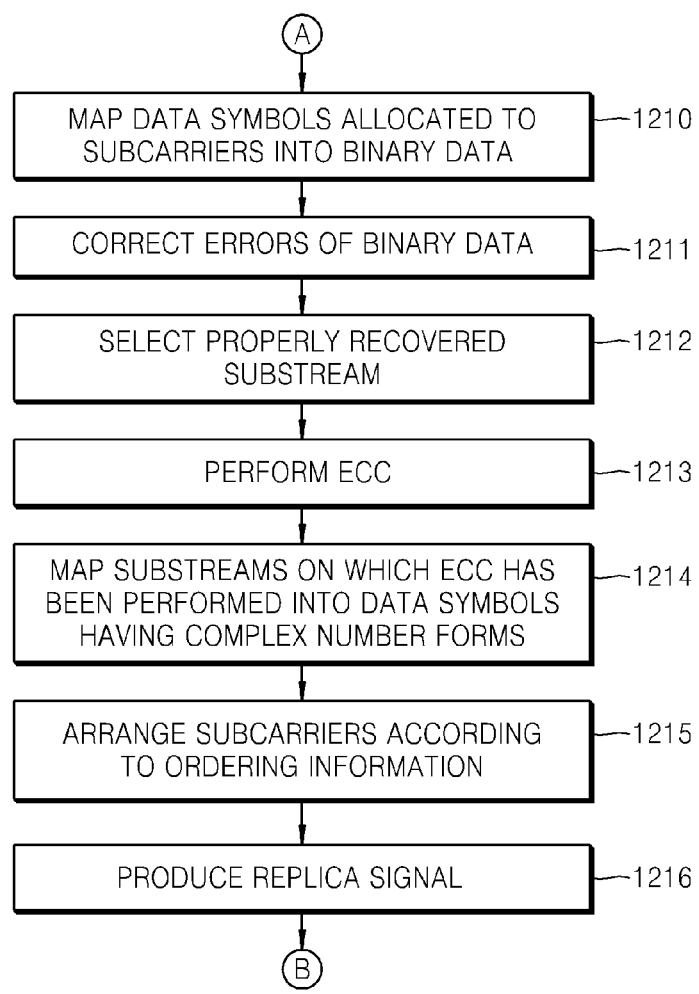

FIGS. 12A and 12B are a flowchart of a MIMO-OFDM receiving method according to an exemplary embodiment of the present invention. Referring to FIGS. 12A and 12B, the MIMO-OFDM receiving method includes operations time-serially performed in the MIMO-OFDM receiver of FIG. 8. Hence, although not described hereinafter, the above-description of the MIMO-OFDM receiver of FIG. 8 can be entirely applied to the MIMO-OFDM receiving method.

In operation 121, the MIMO-OFDM receiver simultaneously receives analog transmission signals from the MIMO-OFDM transmitter of FIG. 3 via a plurality of reception antennas.

In operation 122, the MIMO-OFDM receiver converts the analog transmission signals received in operation 121 into digital reception signals.

In operation 123, the MIMO-OFDM receiver removes the GIs from the digital reception signals corresponding to the results of the conversions performed in operation 122.

In operation 124, the MIMO-OFDM receiver performs FFT on the GI-free reception signals in order to recover the subcarriers to which the data symbols have been allocated.

In operation 125, the MIMO-OFDM receiver estimates the channels of the subcarriers recovered in operation 124, using the pilots included in the recovered subcarriers.

In operation 126, the MIMO-OFDM receiver measures the power intensities of the reception signals of the reception antennas, generates ordering information representing the order of the power intensities of the reception signals based on the results of the measuring, and feeds back the ordering information to the MIMO-OFDM transmitter of FIG. 3.

In operation 127, the MIMO-OFDM receiver subtracts a replica signal corresponding to subcarriers corresponding to a properly recovered substream, the subcarriers including data symbols, from the subcarriers recovered in operation 124.

In operation 128, the MIMO-OFDM receiver divides the subcarriers corresponding to the result of the subtraction performed in operation 127 into subcarrier groups that respectively correspond to substreams remaining after the subtraction of a substream corresponding to the replica signal from the received substreams.

In operation 129, the MIMO-OFDM receiver rearranges the subcarriers corresponding to the substreams obtained in operation 128 back to their original order according to the ordering information provided to the MIMO-OFDM transmitter of FIG. 3.

In operation 1210, the MIMO-OFDM receiver maps the data symbols allocated to the subcarriers arranged in operation 129 into binary data corresponding to the substreams.

In operation 1211, the MIMO-OFDM receiver corrects errors of the binary data corresponding to the result of mapping performed in operation 1210, by using an error correction code included in the binary data.

In operation 1212, the MIMO-OFDM receiver selects a properly recovered substream from among the substreams corresponding to the result of the ECC performed in operation 1211.

In operation 1213, the MIMO-OFDM receiver performs ECC on the substream selected in operation 1212.

In operation 1214, the MIMO-OFDM receiver maps the substreams on which ECC has been performed in operation 1213 into data symbols having complex number forms.

In operation 1215, the MIMO-OFDM receiver arranges the subcarriers corresponding to the result of the mapping in operation 1214, the subcarriers including the data symbols, so as to respectively correspond to the transmission antennas, according to ordering information provided to the MIMO-OFDM transmitter of FIG. 3.

In operation 1216, the MIMO-OFDM receiver produces a replica signal for the subcarriers arranged in operation 1215, and the method returns to operation 1207.

Figure 13:
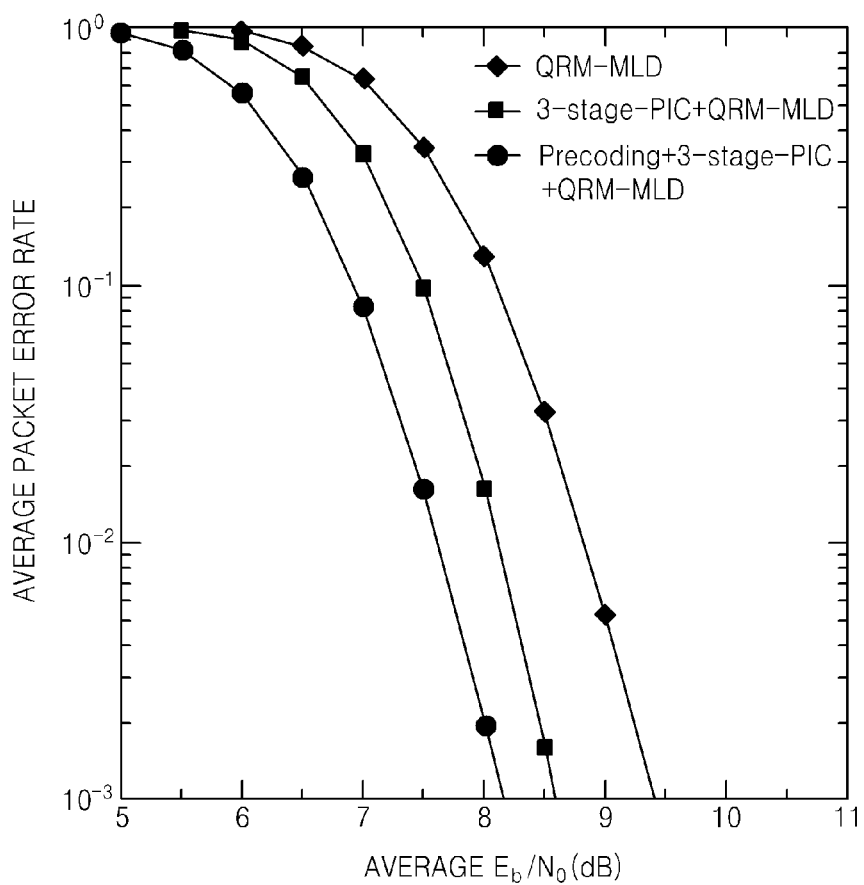
FIGS. 13 through 15 are graphs showing average packet error rates versus averages $E_b/N_0$ in various OFDM transceiving systems.
Figure 14:
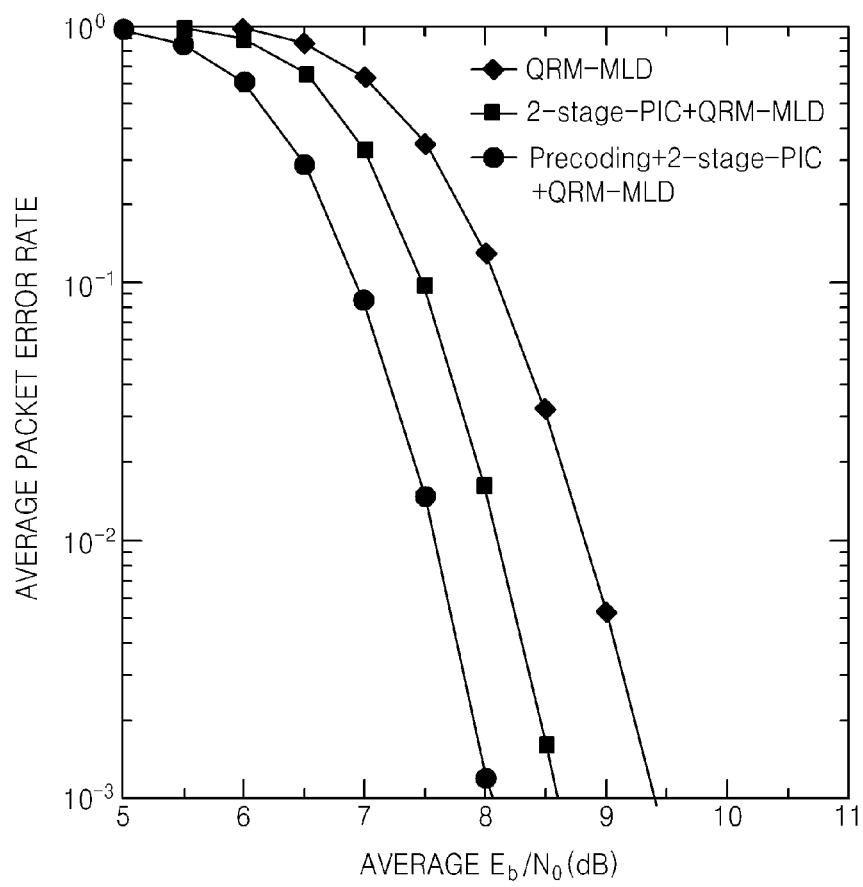
Figure 15:
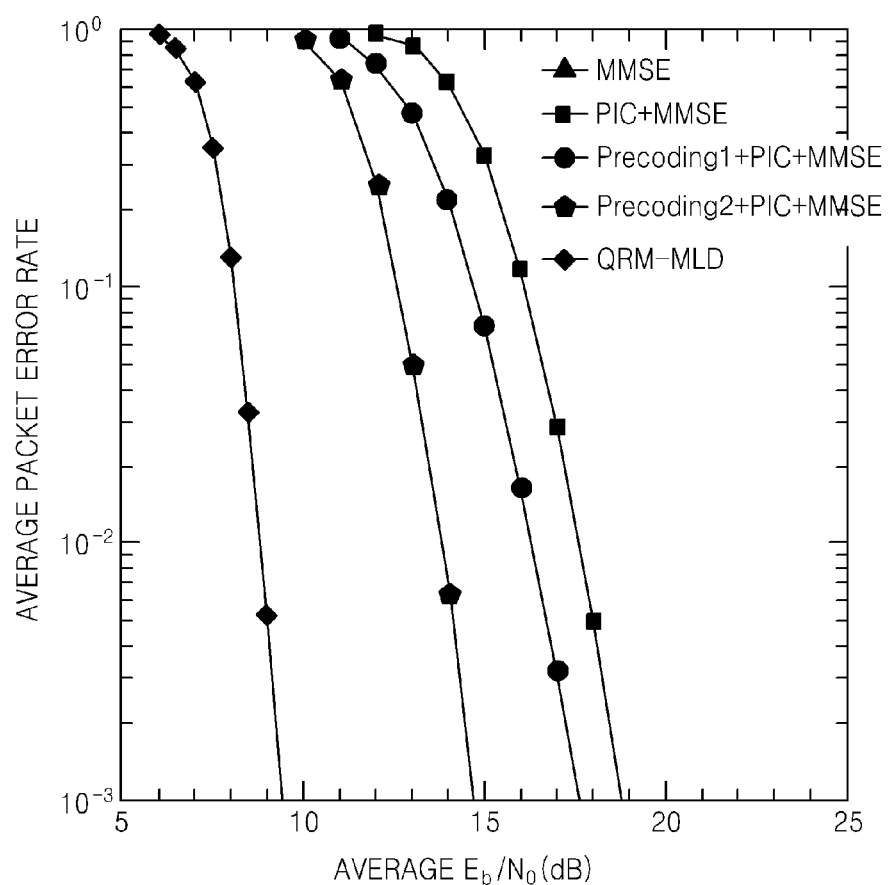

FIGS. 13 through 15 are graphs showing average packet error rates versus averages $E_b/N_0$ in various OFDM transceiving systems. $E_b/N_0$ denotes a ratio of bit energy to noise density, and the unit of $E_b/N_0$ is decibels.

More specifically, FIG. 13 shows average packet error rates in an OFDM transceiving system using only an QRD-MLD algorithm, an OFDM transceiving system performing three replica signal subtractions using PICs and using a QRD-MLD algorithm, and an OFDM transceiving system performing preceding, performing three replica signal subtractions using PICs, and using an QRD-MLD algorithm. Referring to FIG. 13, the third OFDM transceiving system performing preceding, performing three replica signal subtractions using PICs, and using a QRD-MLD algorithm has the lowest average packet error rate.

FIG. 14 shows average packet error rates in an OFDM transceiving system using only a QRD-MLD algorithm, an OFDM transceiving system performing two replica signal subtractions using PICs and using a QRD-MLD algorithm, and an OFDM transceiving system performing preceding, performing two replica signal subtractions using PICs, and using a QRD-MLD algorithm. Referring to FIG. 14, the third OFDM transceiving system performing preceding, performing two replica signal subtractions using PICs, and using a QRD-MLD algorithm has the lowest average packet error rate.

FIG. 15 shows average packet error rates in an OFDM transceiving system using only minimum mean squared errors (MMSEs), an OFDM transceiving system performing replica signal subtraction using PICs and using MMSEs, an OFDM transceiving system performing a first precoding method and replica signal subtraction using PICs, and using MMSEs, an OFDM transceiving system performing a second precoding method and replica signal subtraction using PICs, and using MMSEs, and an OFDM transceiving system using only an QRD-MLD algorithm.

The first precoding method is based on ordering information that represents the order of power intensities of reception signals of reception antennas. The second precoding method is based on ordering information that represents the order of SINRs of the reception signals of the reception antennas. Referring to FIG. 15, the OFDM transceiving system using only a QRD-MLD algorithm has the lowest average packet error rate. However, among the OFDM transceiving systems using the MMSEs, the OFDM transceiving system performing a second precoding method and a replica signal subtraction using PICs, and using MMSEs has the lowest average packet error rate.

Figure 16:
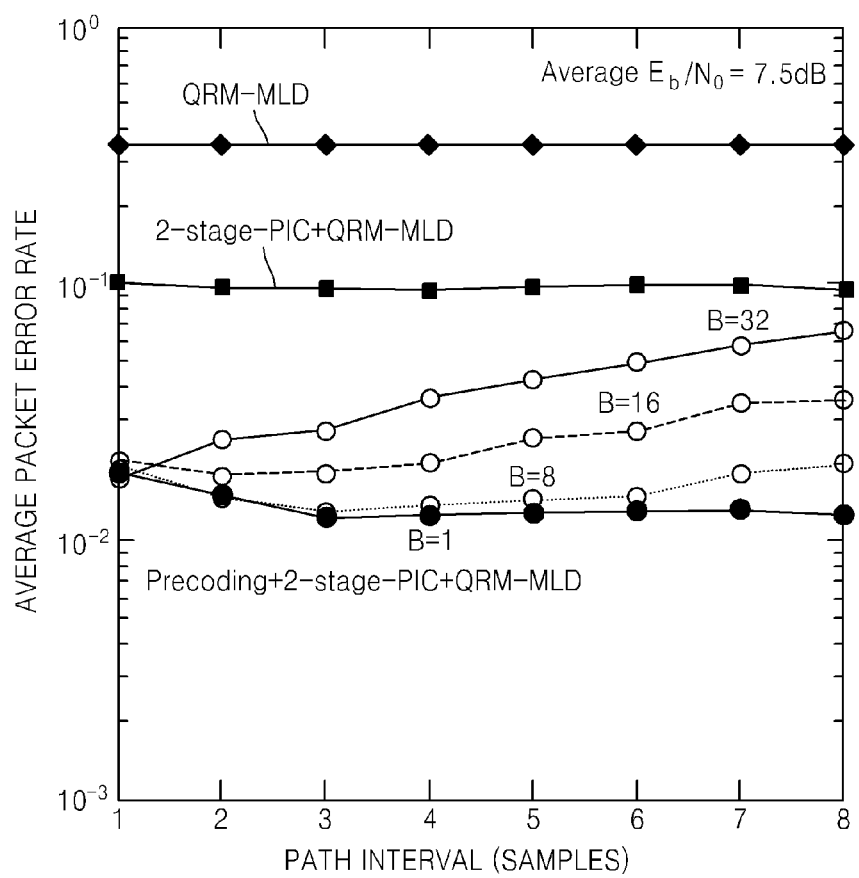
FIG. 16 is a graph showing average packet error rates versus path intervals in various OFDM transceiving systems.

FIG. 16 is a graph showing average packet error rates versus path intervals in various OFDM transceiving systems. The path intervals denote intervals between multiple paths, and the unit of the path intervals is a sample.

FIG. 16 shows average packet error rates in an OFDM transceiving system using only a QRD-MLD algorithm, an OFDM transceiving system performing two replica signal subtractions using PICs and using a QRD-MLD algorithm, and an OFDM transceiving system performing preceding, performing two replica signal subtractions using PICs, and using a QRD-MLD algorithm. Referring to FIG. 16, the third OFDM transceiving system performing preceding, performing two replica signal subtractions using PICs, and using a QRD-MLD algorithm has the lowest average packet error rate.

According to the present invention, a MIMO-OFDM receiver feeds back ordering information, such as the order of power intensities of reception signals of a plurality of reception antennas, to a MIMO-OFDM transmitter. The MIMO-OFDM transmitter arranges subcarriers, to which data symbols have been allocated, so that the subcarriers respectively correspond to a plurality of transmission antennas, according to the fed-back information. Thus, a specific substream can be transmitted via a transmission antenna having the greatest channel gain. Consequently, the probability of properly recovering the specific substream is greatly increased.

Moreover, in the present invention, the generation of errors in all substreams can be almost completely prevented because of the above-described advantage. Thus, parallel interference cancellation between substreams can be effectively performed using the properly recovered substream. Consequently, the degree of signal division of the substreams is improved, leading to an improvement in the quality of communications.

The embodiments of the present invention can be written as computer programs and can be implemented in general-use digital computers that execute the programs using a computer readable recording medium. The structure of data used in the embodiments of the present invention may be recorded in a computer readable recording medium by using various means.

Examples of the computer readable recording medium include magnetic storage media (e.g., ROM, floppy disks, hard disks, etc.), optical recording media (e.g., CD-ROMs, or DVDs), and storage media.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A transmitting method comprising:
arranging subcarriers to which data symbols have been allocated to respectively correspond to a plurality of transmission antennas, according to information regarding an order of reception signals of a plurality of reception antennas of one receiver from the one receiver;
generating transmission signals by modulating the arranged subcarriers; and
transmitting the transmission signals to the one receiver via corresponding plurality of transmission antennas,
wherein the arranging the subcarriers comprises arranging each of the subcarriers from an original order into the order of the reception signals of the reception antennas of the one receiver represented by the information, for each of the transmission antennas corresponding to the reception antennas, and
wherein a number of subcarriers transmitted to each of the reception antennas is the same.

2. The transmitting method of claim 1, wherein the information represents an order of power intensities of the reception signals of reception antennas, measured by the one receiver.

3. The transmitting method of claim 1, wherein the information represents an order of signal interference to noise ratios (SINRs) of the reception signals of reception antennas, measured by the one receiver.

4. The transmitting method of claim 1, wherein:
the information represents an order of predetermined characteristics of the reception signals of at least one of the reception antennas of the one receiver; and
the arranging the subcarriers comprises arranging at least one of the subcarriers to correspond to at least one of the transmission antennas, according to the information.

5. The transmitting method of claim 1, wherein:
the information is provided for blocks,
a first block of the blocks corresponds to a first collection of subcarriers; and
the first collection of subcarriers is arranged to correspond to a first transmission antenna of the plurality of transmission antennas, according to the information.

6. The transmitting method of claim 1, wherein the arranging of the subcarriers comprises generating a precoding matrix based on the information and performing a precoding operation of multiplying the precoding matrix by the subcarriers to arrange the subcarriers.

7. The transmitting method of claim 1, wherein in the generating the transmission signals, the arranged subcarriers are modulated by performing inverse fast Fourier transformation (IFFT) operations on the arranged subcarriers.

8. The transmitting method of claim 1, wherein the subcarriers have orthogonal frequencies.

9. A non-transitory computer readable recording medium that records a computer program for executing a transmitting method, the transmitting method comprising:
arranging subcarriers to which data symbols have been allocated to respectively correspond to a plurality of transmission antennas, according to information regarding an order of reception signals of a plurality of reception antennas of one receiver from the one receiver;
generating transmission signals by modulating the arranged subcarriers; and
transmitting the transmission signals to the one receiver via corresponding plurality of transmission antennas,
wherein the arranging the subcarriers comprises arranging each of the subcarriers from an original order into the order of the reception signals of the reception antennas of the one receiver represented by the information, for each of the transmission antennas corresponding to the reception antennas, and
wherein a number of subcarriers transmitted to each of the reception antennas is the same.

10. A transmitting apparatus comprising:
precoders which arrange subcarriers to which data symbols have been allocated, to respectively correspond to a plurality of transmission antennas, according to information regarding an order of reception signals of a plurality of reception antennas of one receiver from the one receiver;
inverse fast Fourier transformation (IFFT) units which generate transmission signals by performing IFFT operations on the arranged subcarriers; and
transmission units which transmit the transmission signals to the one receiver via the respective transmission antennas,
wherein the precoders arrange each of the subcarriers from an original order into the order of the reception signals of the reception antennas of the one receiver represented by the information, for each of the transmission antennas corresponding to the reception antennas, and wherein a number of subcarriers transmitted to each of the reception antennas is the same.

11. A receiving method comprising:
receiving a plurality of signals from a transmitter via a plurality of reception antennas;
measuring characteristics of the received signals and feeding information about an order of received signals of a plurality of reception antennas of one receiver for the measured characteristics back to the transmitter; and
recovering data from the received signals using information previously provided to the transmitter,
wherein the recovering the data comprises rearranging each of the subcarriers, recovered from the received signals, which are arranged in an order of the received signals of the reception antennas of the one receiver represented by the information previously provided, for each of transmission antennas corresponding to the reception antennas, back to their original order according to the information previously provided, and
wherein a number of subcarriers received by each of the reception antennas is the same.

12. The receiving method of claim 11, wherein the information represents an order of power intensities of the received signals of reception antennas, measured by the one receiver.

13. The receiving method of claim 11, wherein the information represents an order of signal interference to noise ratios (SINR) of the received signals of reception antennas, measured by the one receiver.

14. The receiving method of claim 10, wherein the information represents an order of predetermined characteristics of the received signals of at least one of the reception antennas of the one receiver.

15. The receiving method of claim 10, wherein the information is provided for blocks, the blocks corresponding to collections of subcarriers.

16. The receiving method of claim 11, wherein the recovering the data further comprises:
mapping data symbols allocated to the rearranged subcarriers into data corresponding to substreams.

17. The receiving method of claim 14, further comprising recovering the subcarriers to which the data symbols have been allocated, by performing fast Fourier transformation on the received signals.

18. The receiving method of claim 10, wherein the subcarriers have orthogonal frequencies.

19. A non-transitory computer readable recording medium that records a computer program for executing a receiving method, the receiving method comprising:
receiving a plurality of signals from a transmitter via a plurality of reception antennas;
measuring characteristics of the received signals and feeding back information about an order of received signals of a plurality of reception antennas of one receiver for the measured characteristics to the transmitter; and
recovering data from the received signals using information previously provided to the transmitter,
wherein the recovering the data comprises rearranging each of the subcarriers recovered from the received signals, which are arranged in an order of the received signals of the reception antennas of the one receiver represented by the information previously provided, for each of transmission antennas, corresponding to the reception antennas, back to their original order according to the information previously provided, and
wherein a number of subcarriers received by each of the reception antennas is the same.

20. A receiving apparatus comprising:
reception units which receive a plurality of signals from a transmitter via a plurality of reception antennas;
feedback units which measure predetermined characteristics of the received signals and feed back information about an order of received signals of a plurality of reception antennas of one receiver for the measured characteristics to the transmitter;
predecoders which rearrange the subcarriers recovered from the received signals back to their original order according to the information previously provided to the transmitter; and
symbol demappers which map data symbols allocated to the rearranged subcarriers into data corresponding to substreams,
wherein the predecoders rearrange each of the subcarriers recovered from the received signals, which are arranged in an order of the received signals of the reception antennas of the one receiver represented by the information previously provided, for each of transmission antennas corresponding to the reception antennas, back to their original order according to the information previously provided, and
wherein a number of subcarriers received by each of the reception antennas is the same.

* * * * *